United States Patent
Kaufmann

(10) Patent No.: US 6,685,032 B2
(45) Date of Patent: Feb. 3, 2004

(54) RACK FOR RETAINING MOTORCYCLE BAGS

(76) Inventor: Michael J. Kaufmann, 9301 Bletchley Ave., North Canton, OH (US) 44720

( * ) Notice: Subject to any disclaimer, the term of this patent is extended or adjusted under 35 U.S.C. 154(b) by 0 days.

(21) Appl. No.: 10/074,407

(22) Filed: Feb. 12, 2002

(65) Prior Publication Data

US 2003/0164343 A1 Sep. 4, 2003

(51) Int. Cl.$^7$ .................................................. A47F 5/00
(52) U.S. Cl. ..................................... 211/13.1; 211/198
(58) Field of Search .............................. 211/13.1, 198, 211/85, 85.11

(56) References Cited

U.S. PATENT DOCUMENTS

| | | | |
|---|---|---|---|
| 956,399 A | * | 4/1910 | Morse |
| 1,735,740 A | * | 11/1929 | Elbon |
| 2,114,357 A | * | 4/1938 | Schott |
| 2,122,770 A | * | 7/1938 | Colin |
| 4,046,221 A | | 9/1977 | Edenfield |
| D277,515 S | | 2/1985 | Secor |
| D284,122 S | | 6/1986 | Kizen |
| 4,768,656 A | | 9/1988 | Hartley |
| 5,165,553 A | | 11/1992 | Benson |
| 5,284,256 A | * | 2/1994 | Correll-Antoun ....... 211/198 X |
| 5,287,946 A | * | 2/1994 | Mayo |
| 5,921,347 A | | 7/1999 | Rodriguez et al. |
| D436,756 S | * | 1/2001 | Kashima |
| 6,170,672 B1 | * | 1/2001 | Boettcher .................. 211/13.1 |
| 6,267,345 B1 | * | 7/2001 | Turner |

* cited by examiner

Primary Examiner—Robert W. Gibson, Jr.
(74) Attorney, Agent, or Firm—Sand & Sebolt

(57) ABSTRACT

A rack for supporting off the floor the side mounted motorcycle bags used to carry items on motorcycles while the bags are removed from the motorcycle such as for cleaning or storage. The rack is of a generally A-frame or saw horse configuration, having a main support frame which folds for more compact storage. The main support frame comprises a pair of upright frames which are pivotally connected to an upper longitudinal support member. The upright frames are inwardly inclined from vertical extending along the upper longitudinal support member. A bag mounting bracket assembly is connected to each of the upright frames for removably connecting and supporting one motorcycle bag, which bag mounting assemblies utilize at least some component parts used to mount the motorcycle bags to an actual motorcycle. A pair of trays are secured to a top portion of the main support member for holding various items during use.

28 Claims, 8 Drawing Sheets

RACK FOR RETAINING MOTORCYCLE BAGS

BACKGROUND OF THE INVENTION

1. Technical Field

The invention relates generally to support structures such saddle racks, and more particularly to a structure for supporting the luggage bags used on motorcycles for cross-country travel when removed for cleaning or storage. Specifically, the invention relates to a rack for simulating the side of a motorcycle to retain a luggage bag in position when removed from the motorcycle to prevent damage thereto.

2. Background Information

Motorcycles have become more sophisticated over the years as well as more expensive. Motorcycles now include compact disc players, intercom systems to communicate between driver and passenger, lounge type seats, etc. The basic utilitarian motorcycle has also become an eye-catching piece of artwork, with chrome and nicely molded bodies and farings, especially those motorcycles designed for long trips such as cross-country. Such motorcycles use rigid plastic luggage type motorcycle bags or softer leather motorcycle bags connected to the sides of the body or frame (hereinafter referred to as "frame") at the rear of the motorcycle for carrying items normally carried in suitcases on trips in cars or other enclosed vehicles. That is because there is no trunk nor enclosed passenger compartment such as in an automobile in which to store items such as a suitcase. The luggage type motorcycle bags are typically removably connected to the motorcycle to permit cleaning of road dirt from the luggage carrier. This is done in a variety of ways including various bracket and pin arrangements depending on the manufacturer and model of the particular motorcycle. The leather motorcycle bags are typically semi-permanently connected to the motorcycle using screws or bolts.

One example of such luggage type motorcycle bags are used on motorcycles manufactured by Harley-Davidson, Inc. of Milwaukee, Wis. These motorcycle bags comprise respective rigid plastic containers and hingedly connected or removable covers. The containers include a rectangular bottom wall and four upstanding side walls forming a parallelogram shape as viewed from the side. The innermost side wall of each motorcycle bag includes a pair of holes in each which is disposed a resilient grommet. The bottom wall of each motorcycle bag includes a rounded L-shaped groove of a semi-circular cross-section with a pair of resilient, semi-tubular noise damping inserts adhesively affixed within each groove.

The motorcycle bags removably mount to the Harley-Davidson motorcycle using a pair of bag mounting bracket assemblies. Each bracket assembly includes a pair of Z-shaped upper mounting brackets and a rounded L-shaped lower bracket which is mateable with the L-shaped groove in the bottom of the respective motorcycle bag. The upper mounting brackets are mounted to the sides of the motorcycle frame. The lower bracket also bolts to the frame of the motorcycle below the upper mounting brackets, respective long legs of the brackets running longitudinally of the motorcycle and respective short legs thereof running inwardly toward each other at a rear of the motorcycle frame. The motorcycle bags are removably connectable to the upper mounting brackets using a pair of locking pin assemblies. Each locking pin assembly includes a removable twist-lock pin and a mating fixed U-shaped clip with an attached transverse spring pin arrangement disposed in a respective slot of the upper mounting brackets. Each pin includes a headed body with a wire handle pivotally connected thereto. The pins are inserted through the respective grommeted hole and rotated about ninety degrees such that a pair of hooks extend longitudinally of the headed body to removably engage and lock to the transverse spring pin of the respective U-shaped clip. The procedure is reversed to remove the motorcycle bags from the motorcycle.

The motorcycle bags are often removed from the motorcycle for cleaning off of road dirt and for temporary storage when desired. In such a removed condition, the motorcycle bags are prone to damage by directly resting them on the concrete floor of a garage, or by being inadvertently kicked by persons walking past them while removed. This is undesirable as the motorcycle bags are difficult to repair and cost quite a bit of money to replace entirely.

While applicant is not aware of any devices or support structures designed specifically to protect motorcycle bags, a similar situation exists for the storage of riding saddles used for horseback riding. Riding saddles are expensive, prone to damage if not properly stored, and also will lose their shape if not stored in the desired position due to the nature of the leather from which they are primarily constructed. The problem was solved in the wild west by placing the saddles on the horizontal rails of fences. Saddle racks have since been developed for supporting the saddles during periods of non-use help to maintain their shape. For example, in U.S. Pat. No. 5,165,553 issued to Benson is disclosed a self-adjusting saddle rack having a pair of mutually inclined seat panels which are pivotally supported by a base structure which includes a pair of leg assemblies. The panels are self-adjusting so as to automatically conform to the underside of any saddle positioned thereon to maintain the desired form of the saddle. In U.S. Pat. No. 4,046,221 issued to Edenfield is disclosed a saddle support which includes a pair of parallel rails supported by two pairs of support legs which are pivotally mounted to oppposite ends of the two rails so as to be movable together. One pair of support legs are pivotable about a pin while the second pair of support legs includes a double-action pivot hinge which allows the second pair of support legs to be folded inwardly toward each other and then pivoted downwardly against the support rails, such that the entire support may be folded into a compact unit. In U.S. Pat. No. 4,768,656 issued to Hartley is disclosed a collapsible stackable saddle rack which has a plurality of flat planar pieces which are stackable one on the other for storage. The pieces can temporarily be connected together into a self supporting saddle rack. Other examples of saddle racks are disclosed in U.S. Pat. No. Des. 284,122 issued to Kizen and U.S. Pat. No. Des. 277,515 issued to Secor.

Other support structures include saw horses such as the folding saw horse disclosed in U.S. Pat. No. 5,921,347 issued to Rodriguez et al. The saw horse includes an elongate support beam, a pair of fixed legs secured to one side of the elongate support beam, and a pair of folding legs pivotally attached to the pair of fixed legs. The saw horse allows the user to adjust the height of a saw horse, is sturdy and stable in use, and folds for compact storage.

BRIEF SUMMARY OF THE INVENTION

The present invention comprises a rack for retaining motorcycle bags each of which includes a closeable container which has at least one of an innermost wall and a bottom wall adapted for removable connection to a motorcycle. The rack comprises a main support frame for placement on a floor surface, and at least one bag mounting assembly connected to the main support frame adapted for removably connecting and supporting one motorcycle bag on the main support frame above the floor surface.

A preferred version of the rack includes a main support frame which folds for more compact storage, comprising a pair of upright frames which are pivotally connected to an upper longitudinal support member. The upright frames are inwardly inclined from vertical extending along the upper longitudinal support member. A bag mounting bracket assembly is connected to each of the upright frames for removably connecting and supporting one motorcycle bag, which bag mounting assemblies utilize at least some component parts used to mount the motorcycle bags to an actual motorcycle. A pair of trays are secured to a top portion of the main support member for holding various items during use.

BRIEF DESCRIPTION OF THE SEVERAL VIEWS OF THE DRAWINGS

The best mode presently contemplated for carrying out the invention is illustrated in the accompanying drawings, in which.

Figure 1:
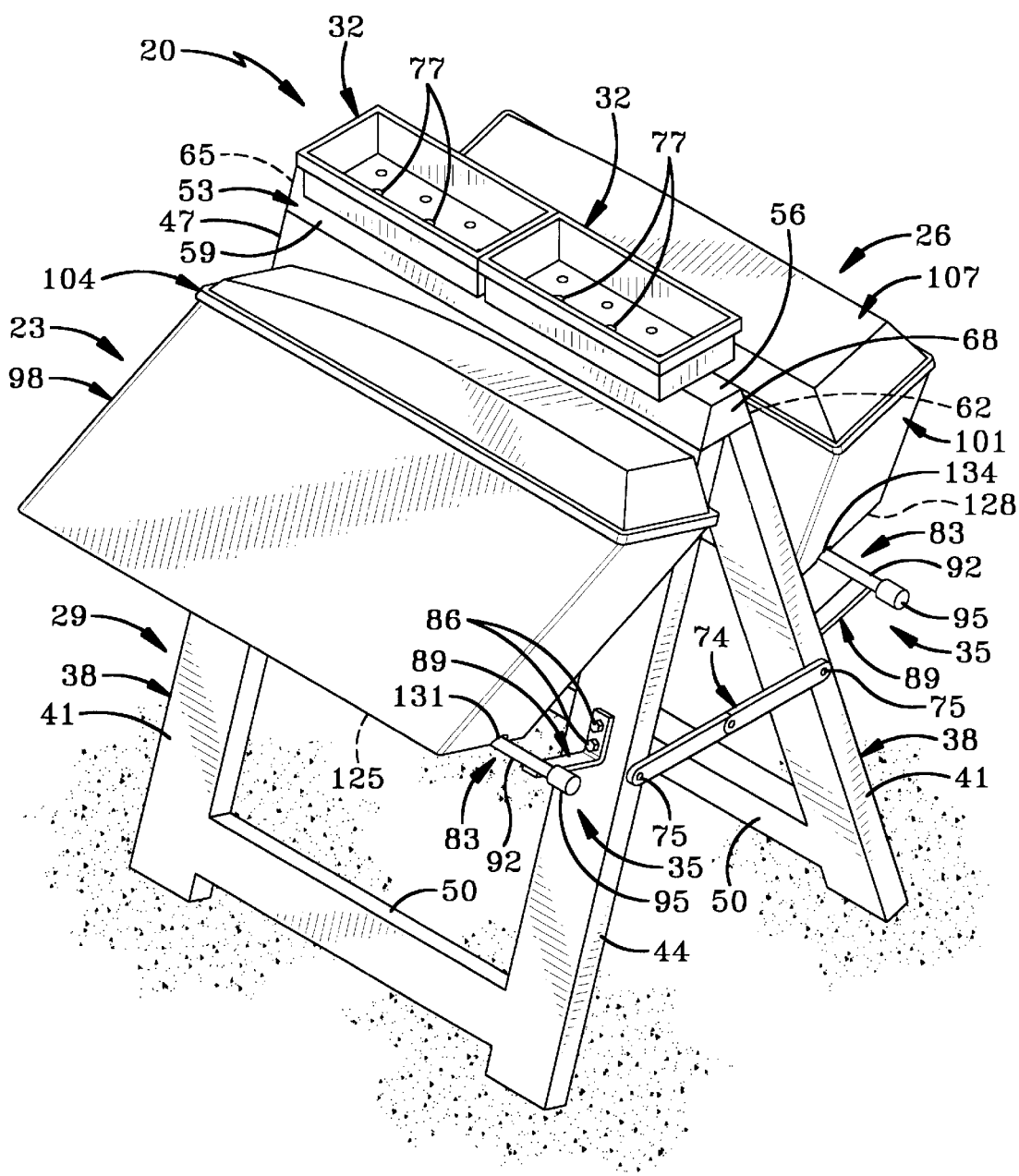
FIG. 1 is a perspective view of an exemplary rack in accordance with the present invention as used holding a pair of removable motorcycle bags.

Preferred embodiments of the invention, illustrative of the best modes in which applicant contemplates applying the principles, are set forth in the following description and are shown in the drawings and are particularly and distinctly pointed out and set forth in the appended claims.

DETAILED DESCRIPTION OF THE INVENTION

Figure 2:
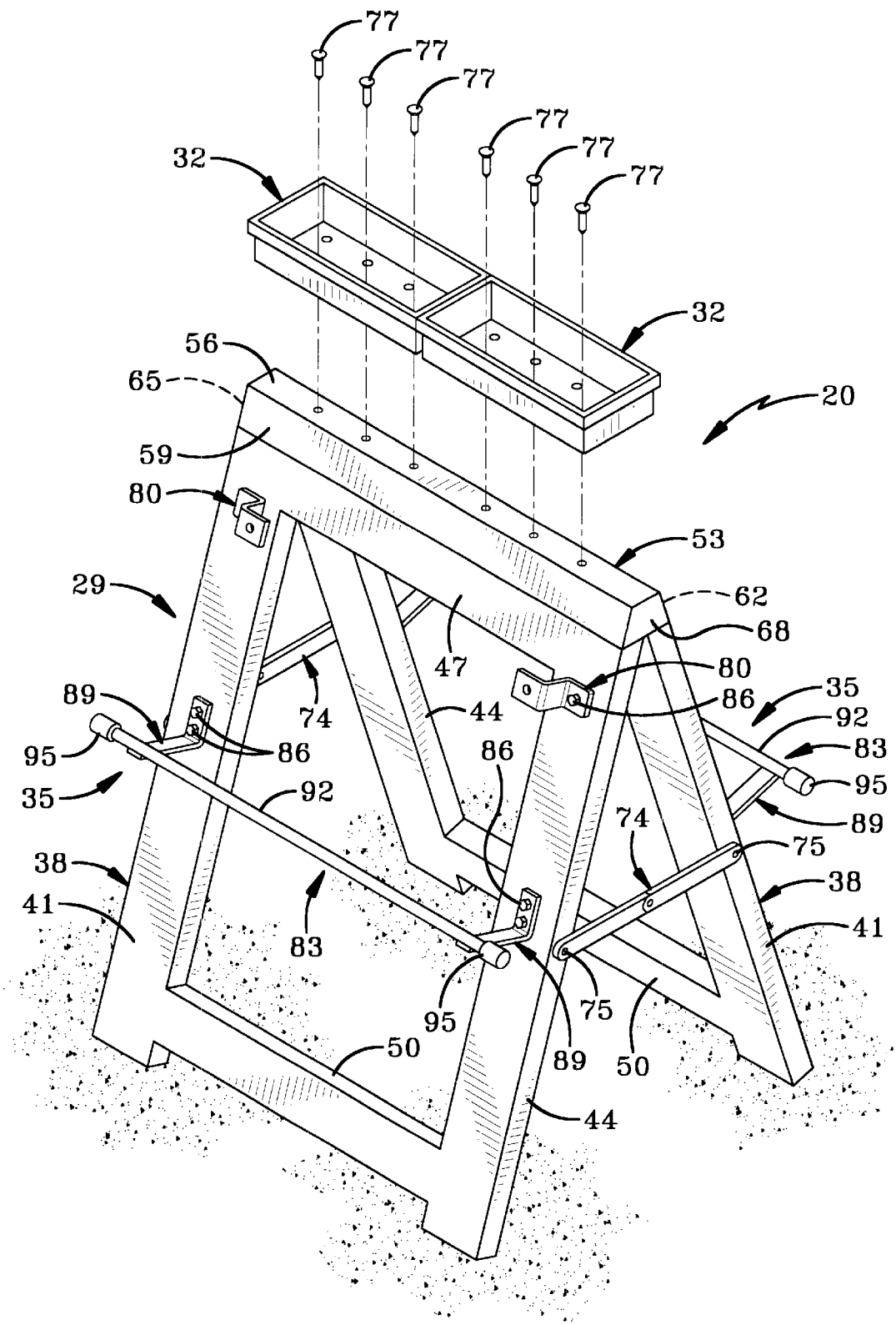
FIG. 2, an exploded perspective view of the rack showing the connection of a storage tray to the rack.
Figure 3:
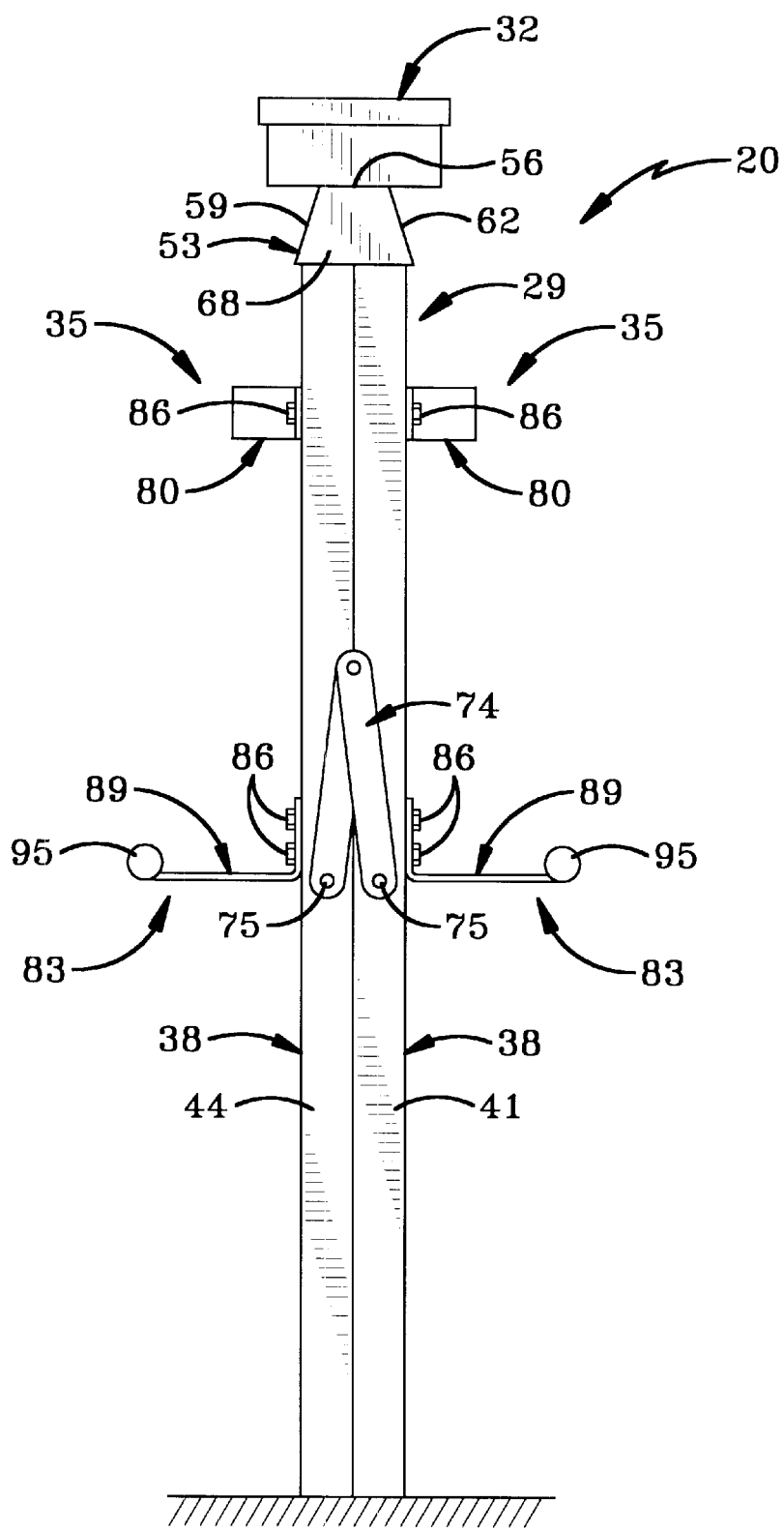
FIG. 3, a front elevational view of the rack shown in a closed position for compact storage thereof while not in use.
Figure 8:
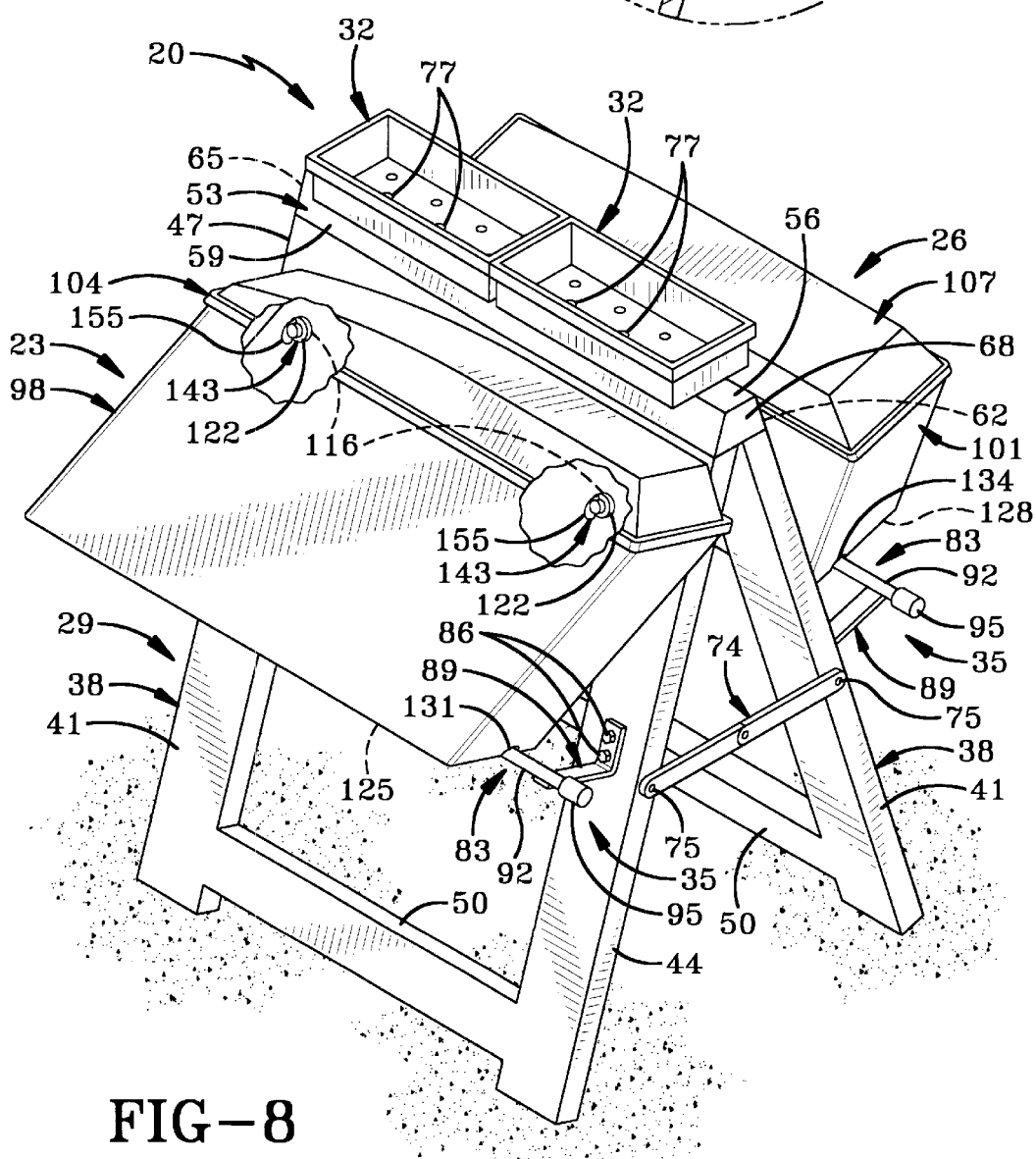
FIG. 8, a perspective view of the rack corresponding to FIG. 1 with one motorcycle bag being partially broken to show the twist-lock pins.

Referring to FIGS. 1–3, and 8, therein is shown a rack in accordance with the present invention, designated generally at 20, as used to support a pair of luggage type motorcycle bags 23 and 26. The rack 20 includes a folding frame 29, a pair of trays 32, and a pair of bag mounting bracket assemblies 35. The folding frame 29 includes a pair of upright frames 38 each having a pair of upright leg members 41 and 44 which are interconnected by respective upper and lower connecting members 47 and 50. The upper connecting members 47 are pivotally connected to a hollow longitudinal member 53, which includes a top wall 56, respective angularly dependent side walls 59 and 62, and respective end walls 65 and 68, at respective pivot pins 71. A pair of transverse pivoting limiting brackets 74 foldably interconnect respective pairs of the leg members 41 and 44 at respective riveted pivots 75 to limit lateral movement apart thereof. The trays 32 are secured to the top wall 56 of the longitudinal member 53 using a plurality of self-tapping screws 77. The bag mounting bracket assemblies 35 each include a pair of Z-shaped upper mounting brackets 80 and an elongate lower bracket 83. The upper mounting brackets 80 are mounted to one of the upright leg members 41 and 44 using a respective thread cutting bolt 86. The lower bracket 83 comprises a pair of L-shaped lower mounting brackets 89 which mounts to one of the upright leg members 41 and 44 using a plurality of the bolts 86 and supports an elongate support tube or support rod 92 affixed thereto such as by welding. A pair of rubber end cushions or end caps 95 cushion the rod 92 against inadvertent impact with a person's legs (not shown).

Figure 5:
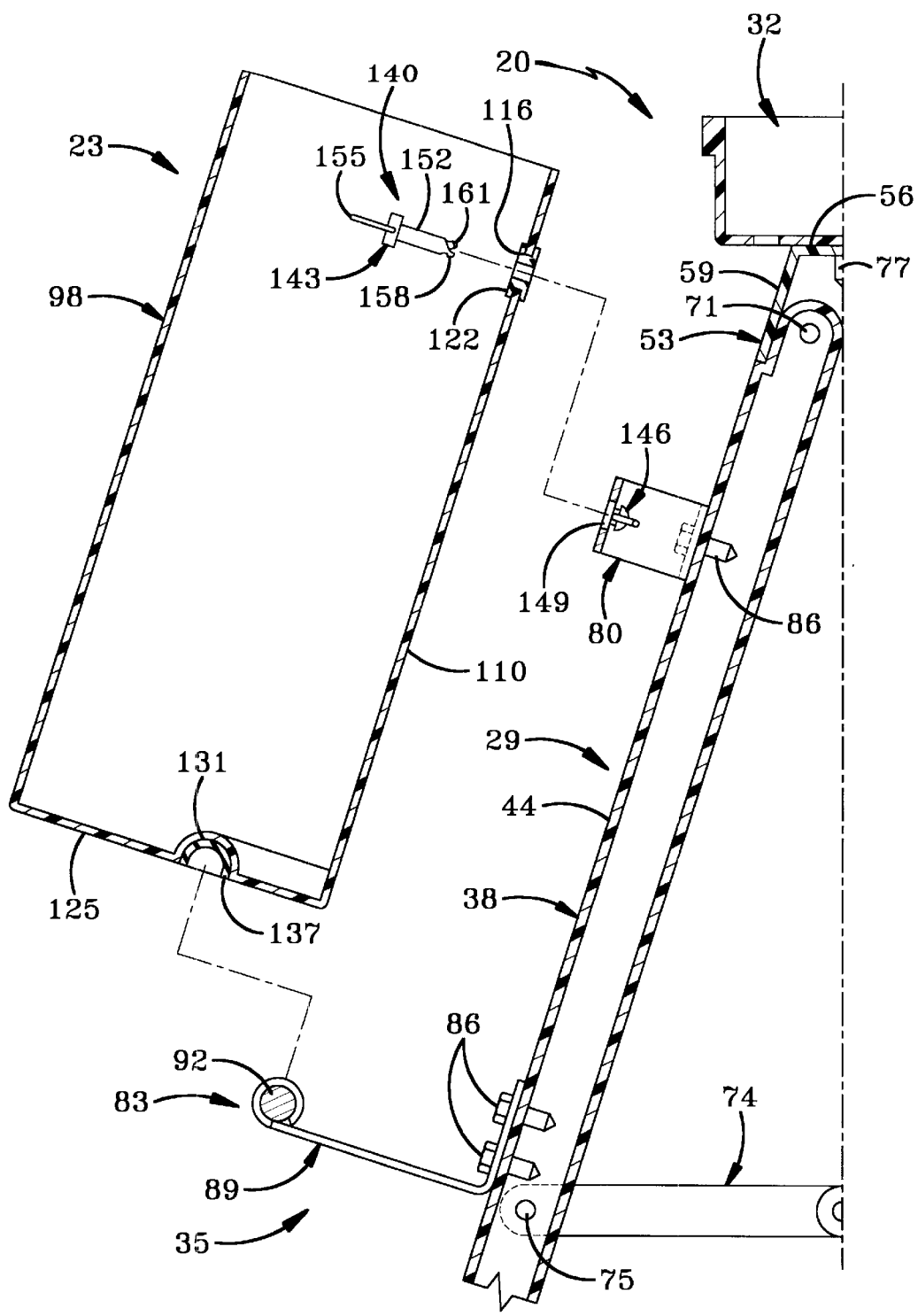
FIG. 5, a fragmentary lateral vertical sectional view showing one motorcycle bag prior to connection to the rack.
Figure 6:
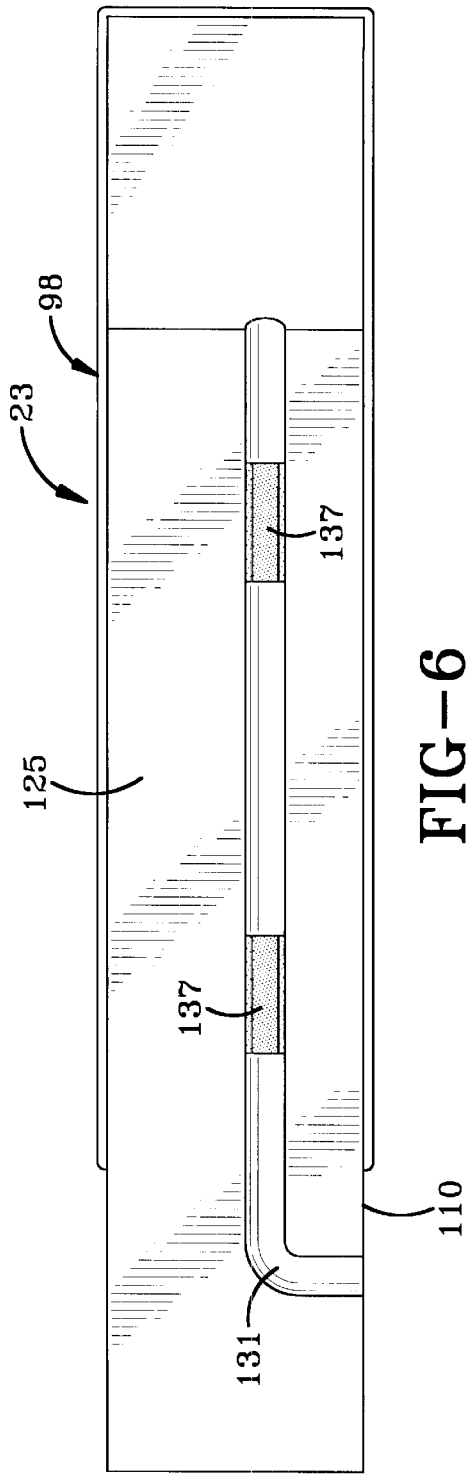
FIG. 6, a bottom plan view of one motorcycle bag showing a rounded L-shaped groove for retaining the motorcycle bag on a motorcycle and on the rack.
Figure 9:
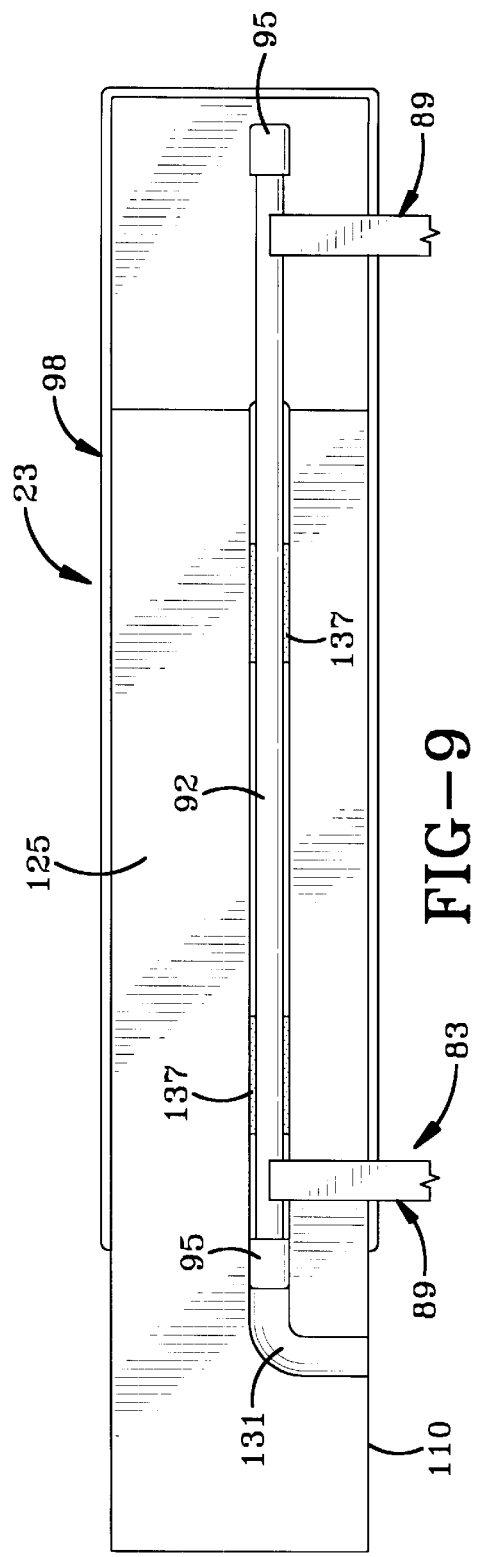
FIG. 9, a bottom plan view of one motorcycle bag corresponding to FIG. 6 showing a support rod as disposed in the groove of the bottom wall for retaining the motorcycle bag on the rack.
Figure 7:
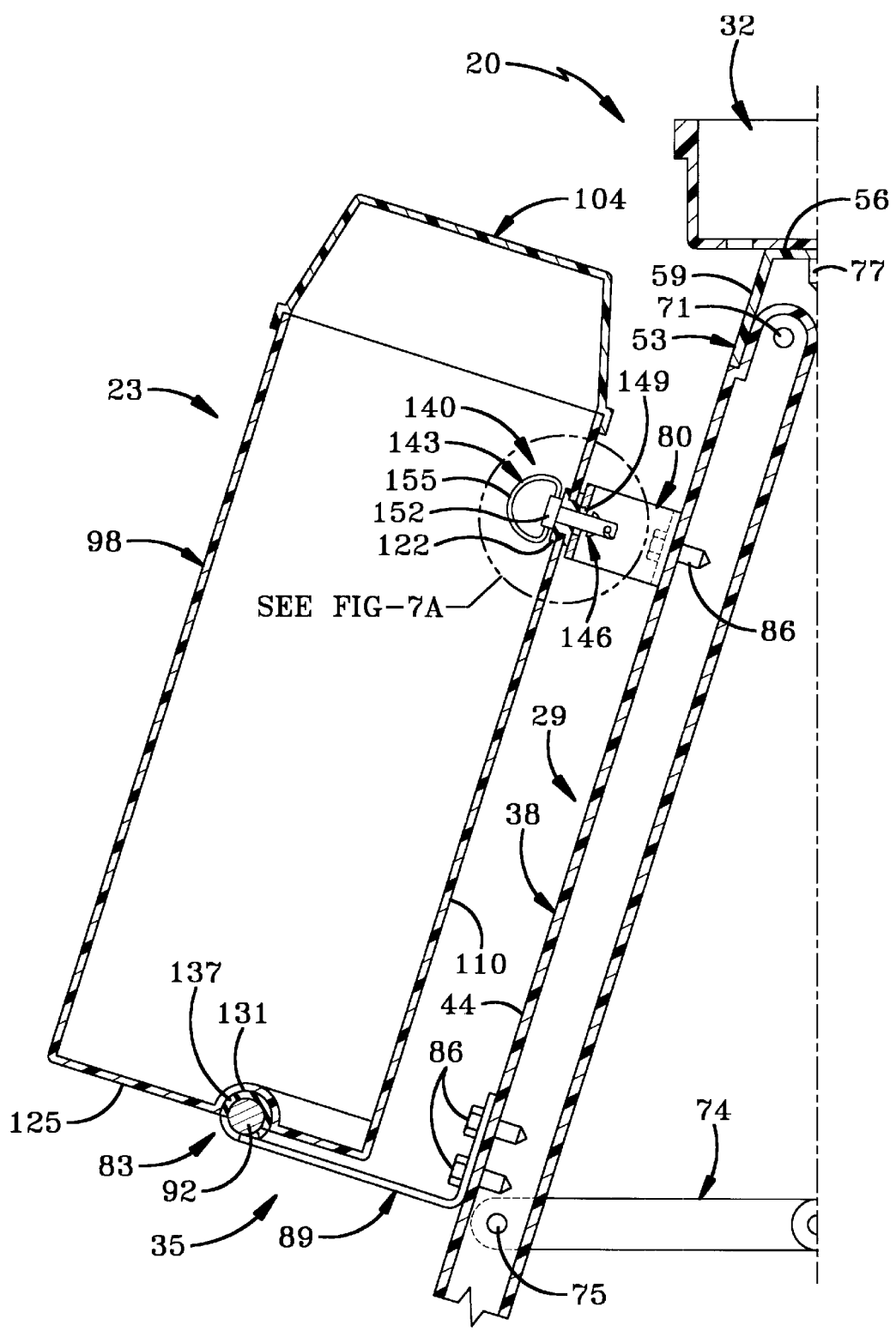
FIG. 7, a fragmentary lateral vertical sectional view showing one motorcycle bag after connection to the rack.

As best shown in FIGS. 1, 5, and 6–9, each of the motorcycle bags 23 and 26 shown is of the type used on Harley-Davidson motorcycles, and thus the bag mounting bracket assemblies 35 shown are for that type of motorcycle bag 23 and 26. The rack 20 can be adapted for use with other types of removable motorcycle bags by utilizing bag mounting bracket assemblies adapted for use therewith. Motorcycle bags 23 and 26 comprise respective containers 98 and 101, and removable covers 104 and 107. Respective innermost walls 110 and to 113 of the motorcycle bags 23 and 26 each include respective pairs of holes 116 and 119, in which of each is disposed a respective resilient grommet 122. Respective bottom walls 125 and 128 of the motorcycle bags 23 and 26 include respective rounded L-shaped grooves 131 and 134 of a semi-circular cross-section. A pair of semi-tubular noise damping inserts 137 are adhesively affixed within each respective groove 131 and 134 to closely receive the respective rod 92 of the lower bracket 83.

Figure 4:
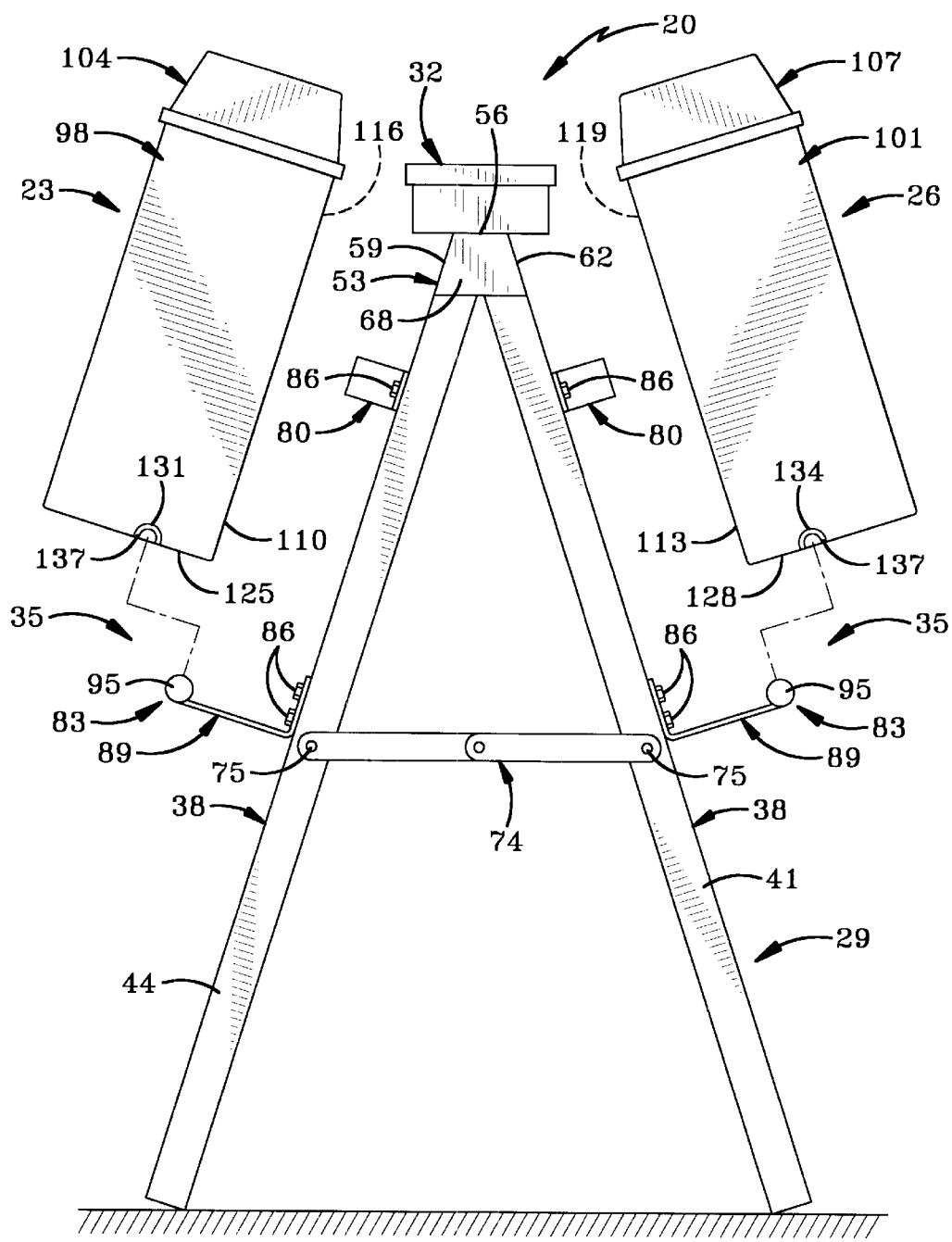
FIG. 4, a front elevational view of the rack in an opened position as used showing the connection of the respective motorcycle bags.
Figure 7A:
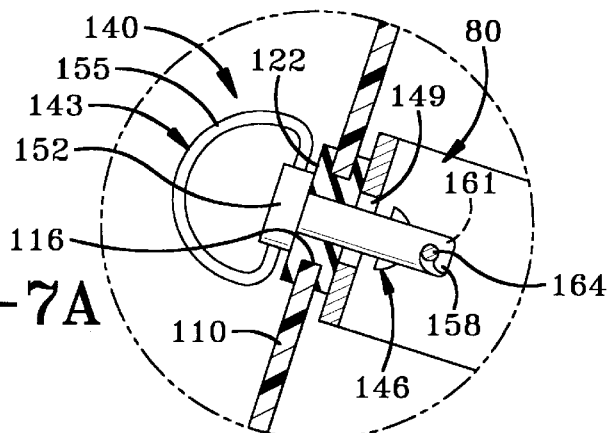
FIG. 7A, an enlarged view taken on the line 7A—7A of FIG. 7 showing the details of a twist-lock pin which retains the motorcycle bags to the rack.

Referring particularly to FIGS. 4–7A and 9, the respective motorcycle bags 23 and 26 are removably connectable to the upper mounting brackets 80 using respective locking pin assemblies 140, each comprising a removable twist-lock pin 143 and mating U-shaped clip 146 disposed in respective slots 149 of the upper mounting brackets 80. Each pin 143 includes a headed body 152 and pivotably mounted handle 155. A pair of hooks 158 and 161 of the headed body 152 removably lock to a transverse spring pin 164 of the clip 146. The bags 23 and 26 removably connect, to the rack 20 by first placing the bottom walls 125 and 128 of the motorcycle bags 23 and 26 onto the support rod 92 of the corresponding lower bracket 83 with the L-shaped grooves 131 and 134 of bottom walls 125 and 128 aligning with the respective support rod 92. A twist-lock pin 143 is then inserted through the grommet 122 disposed in the respective pair of holes 116 and 119 through the innermost walls 110 and 113 of the motorcycle bags 23 and 26 to mate with the clip 146 in the corresponding upper mounting bracket 80. The twist-lock pin 143 is then rotated a quarter turn to lock the hooks 158 and 161 to the transverse spring pin 164 of the clip 146 to secure the innermost walls 110 and 113 of the motorcycle bags 23 and 26 to the upper mounting brackets 83. The procedure is reversed to remove the motorcycle bags 23 and 26 from the rack 20.

The rack 20 can be used for storage of the motorcycle bags, or more often, to hold the motorcycle bags while they are being cleaned. The trays 32 provide a convenient place to hold cleaning liquids, polish and rags during the cleaning process. After use, the rack 20 folds to provide a more compact unit for storage.

Many variations can be made to the rack of the present invention while staying within the same inventive concept. For example, the rack can be adapted for use with virtually any removable motorcycle bag by changing the bag mounting bracket assemblies to suite the particular bag design. Other types of racks than the folding A-frame type are possible, such as folding and non-folding designs with upright legs.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A rack for retaining motorcycle bags above a floor surface, the motorcycle bags being of the type each of which includes a closeable container which has at least one of an innermost wall and a bottom wall adapted for removable connection to a motorcycle, the rack comprising:
    a main support frame for placement on the floor surface; and
    at least one bag mounting assembly connected to said main support frame adapted for removably connecting and supporting one motorcycle bag on said main support frame above the floor surface; wherein the at least one bag mounting assembly utilizes at least some component parts used to mount the motorcycle bags to an actual motorcycle.

2. The rack according to claim 1, comprising a pair of bag mounting assemblies connected to opposite sides of the main support frame for removably connecting and supporting a pair of motorcycle bags on said main support frame.

3. The rack according to claim 1, wherein the motorcycle bags are removably connectable to the main support frame using respective locking pin assemblies, each locking pin assembly comprising a removable twist-lock pin and a mating fixed U-shaped clip, said twist-lock pins each including a headed body and a handle pivotably mounted to said headed body and a pair of hooks extending from said headed body, said U-shaped clip having an attached transverse spring pin operatively connected to said main support frame, said twist-lock pins which extend through a respective hole through the innermost wall of the respective motorcycle bags such that said pair of hooks removably lock to said spring pin of one respective U-shaped clip.

4. The rack according to claim 2, wherein the bag mounting assemblies each include a pair of upper mounting brackets adapted for connection to the innermost wall of the motorcycle bag and an elongate lower bracket adapted for supporting the bottom wall of the motorcycle bag.

5. The rack according to claim 4, wherein the upper brackets are generally Z-shaped, and the lower bracket comprises a pair of generally L-shaped lower mounting brackets and an elongate support member affixed thereto.

6. The rack according to claim 5, wherein the support member has a generally round cross-section with respective ends thereof each covered by an end cushion, said support member and said end cushions being adapted for engaging a groove in the bottom walls of the respective motorcycle bags.

7. The rack according to claim 5, wherein the motorcycle bags are removably connectable to the upper mounting brackets using respective pairs of locking pin assemblies.

8. The rack according to claim 7, wherein each locking pin assembly comprises a removable twist-lock pin and a mating fixed U-shaped clip, said twist-lock pins each including a headed body and a handle pivotably mounted to said headed body and a pair of hooks extending from said headed body, said U-shaped clip having an attached transverse spring pin connected to said upper mounting brackets, said twist-lock pins which extend through a respective hole through the innermost wall of the respective motorcycle bags such that a pair of hooks removably lock to said spring pin of one respective U-shaped clip.

9. The rack according to claim 1, wherein the main support frame includes a pair of upright frames which are interconnected by an upper longitudinal support member.

10. The rack according to claim 9, wherein the upright frames are inwardly inclined from vertical and extend along the upper longitudinal support member.

11. The rack according to claim 10, comprising a pair of bag mounting bracket assemblies each being connected to one of the upright frames for removably connecting and supporting one motorcycle bag on the main support frame.

12. The rack according to claim 11, wherein the upright frames each comprise a pair of upright leg members which are interconnected by respective upper and lower connecting members.

13. The rack according to claim 1, wherein the main support frame folds to provide a more compact unit for storage.

14. The rack according to claim 13, wherein the main support frame includes a pair of upright frames which are interconnected by an upper longitudinal support frame, and comprising a pair of bag mounting bracket assemblies each being connected to one of said upright frames for removably connecting and supporting one motorcycle bag on the main support frame.

15. The rack according to claim 14, wherein the upright frames are pivotally connected to the upper longitudinal support frame.

16. The rack according to claim 15, wherein the upright frames are inwardly inclined from vertical and extend along the upper longitudinal support frame.

17. The rack according to claim 16, wherein the main support frame includes at least one transverse pivoting limiting bracket connected to each upright frame to limit lateral movement apart of said upright frames.

18. The rack according to claim 14, wherein the upper longitudinal support frame comprises an upper longitudinal support member.

19. The rack according to claim 18, wherein the longitudinal member comprises a top wall, respective angularly dependent side walls and respective end walls, the upright frames being pivotally connected to said longitudinal member at respective pivot pins.

20. The rack according to claim 19, further comprising at least one tray secured to the top wall of the longitudinal member.

21. The rack according to claim 13, wherein the upright frames each comprise a pair of upright leg members which are interconnected by respective upper and lower connecting members.

22. The rack according to claim 1, further comprising at least one tray secured to a top portion of the main support frame.

23. A rack for retaining motorcycle bags above a floor surface, the motorcycle bags being of the type each of which includes a closeable container which has at least one of an innermost wall and a bottom wall adapted for removable connection to a motorcycle, the rack comprising:

a main support frame for placement on the floor surface; and at least one bag mounting assembly connected to said main support frame adapted for removably connecting and supporting one motorcycle bag on said main support frame above the floor surface; said bag mounting assembly including locking pin assemblies for removably connecting the motorcycle bags to the main support frame; each locking pin assembly comprising a removable twist-lock pin and a mating fixed U-shaped clip, said twist-lock pins each including a headed body and a handle pivotably mounted to said headed body and a pair of hooks extending from said headed body, said U-shaped clip having an attached transverse spring pin operatively connected to said main support frame, said twist-lock pins which extend through a respective hole through the innermost wall of the respective motorcycle bags such that said pair of hooks removably lock to said spring pin of one respective U-shaped clip.

24. A rack for retaining motorcycle bags above a floor surface, the motorcycle bags being of the type each of which includes a closeable container which has at least one of an innermost wall and a bottom wall adapted for removable connection to a motorcycle, the rack comprising:

a main support frame for placement on the floor surface; and at least one bag mounting assembly connected to said main support frame adapted for removably connecting and supporting one motorcycle bag on said main support frame above the floor surface, the bag mounting assembly including a pair of generally Z-shaped upper mounting brackets adapted for connection to the innermost wall of the motorcycle bag and an elongate lower bracket adapted for supporting the bottom wall of the motorcycle bag, said lower bracket comprising a pair of generally L-shaped lower mounting brackets and an elongate support member affixed thereto.

25. A rack for retaining motorcycle bags according to claim 24, wherein the support member has a generally round cross-section with respective ends thereof each covered by an end cushion, said support member and said end cushions being adapted for engaging a groove in the bottom walls of the respective motorcycle bags.

26. A rack for retaining motorcycle bags according to claim 24, wherein the motorcycle bags are removably connectable to the upper mounting brackets using respective pairs of locking pin assemblies.

27. A rack for retaining motorcycle bags above a floor surface, the motorcycle bags being of the type each of which includes a closeable container which has at least one of an innermost wall and a bottom wall adapted for removable connection to a motorcycle, the rack comprising:

a main support frame for placement on the floor surface, said main support frame being foldable to provide a more compact unit for storage, said main support frame including a pair of upright frames which are interconnected by an upper longitudinal support member, wherein the upper longitudinal support member comprises a top wall, respective angularly dependent side walls and respective end walls, the upright frames being pivotally connected to said upper longitudinal support member at respective pivot pins; and a pair of bag mounting assemblies, each bag mounting assembly being connected to one of said upright frames on said main support frame, said bag mounting assemblies being adapted for removably connecting and supporting one motorcycle bag on said main support frame above the floor surface.

28. The rack according to claim 27, further comprising at least one tray secured to the top wall of the upper longitudinal support member.

* * * * *